United States Patent [19]

Ignasiak

[11] Patent Number: 5,534,158

[45] Date of Patent: Jul. 9, 1996

[54] METHOD FOR CLEAN-UP OF SOILS OR REFUSE MATERIALS CONTAMINATED WITH HIGHLY VISCOUS COAL OR PETROLEUM DERIVED TARS/OILS

[75] Inventor: Teresa Ignasiak, Edmonton, Canada

[73] Assignee: Envirotech Consulting Inc., Edmonton, Canada

[21] Appl. No.: 414,958

[22] Filed: Mar. 31, 1995

Related U.S. Application Data

[63] Continuation of Ser. No. 170,877, Dec. 21, 1993, abandoned.

[51] Int. Cl.$^6$ .................... B01D 17/035; B01D 11/02; B09B 5/00
[52] U.S. Cl. .................... 210/703; 209/10; 209/12.1; 209/17; 209/166; 210/806; 210/908; 134/19; 134/25.1; 134/40
[58] Field of Search .................... 209/164, 166, 209/167, 5, 10, 12.1, 17; 210/703, 704, 908, 909, 806; 134/19, 25.1, 40

[56] References Cited

U.S. PATENT DOCUMENTS 4,783,263  11/1988  Trost .
5,019,245   5/1991  Ignasiak .

Primary Examiner—Thomas M. Lithgow

[57] ABSTRACT

A process is provided for clean-up of soils contaminated with highly viscous coal tar and/or petroleum derived organics. This new invention is based on application of the modified Clean Soil Process integrated with modified thermal desorption technology. This new invention utilizes the unexpected advantages of integration of the Clean Soil Process and conventional thermal desorption which cannot, when applied separately or in sequence (Clean Soil Process followed by Conventional Thermal Desorption), furnish satisfactory clean-up, but when integrated have the capacity to clean the most difficult contaminated soils (including soils contaminated by manufactured gas plants) to about 100 ppm, or less of total soluble organics and less than 3 ppm of PAH's.

1 Claim, 3 Drawing Sheets

Flowsheet of the Integrated Process for Treating Tar/Oil Contaminated Soil According to the Present Invention.

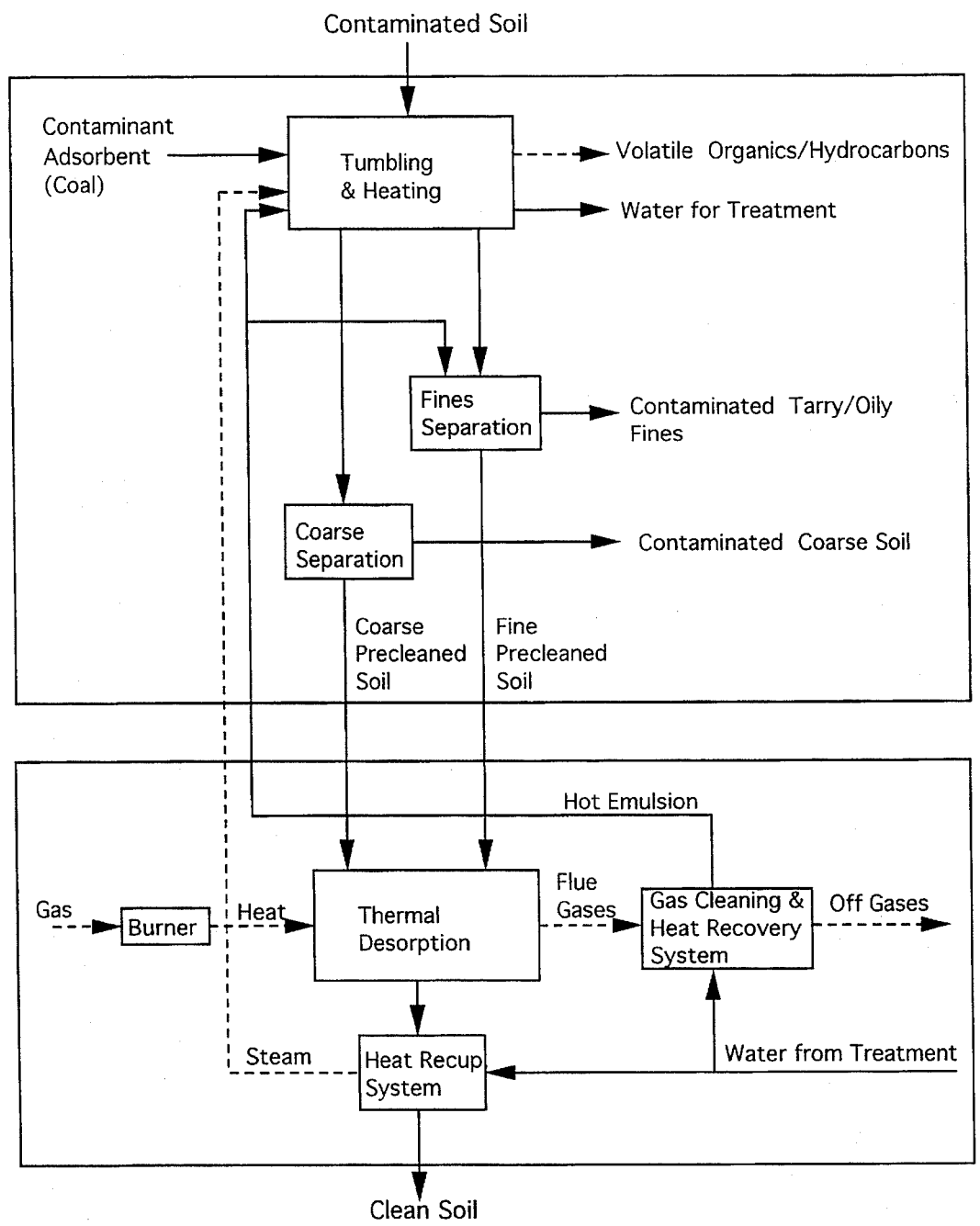
Figure 1. Preferred Steps for Treating Tar/Oil Contaminated Soils.

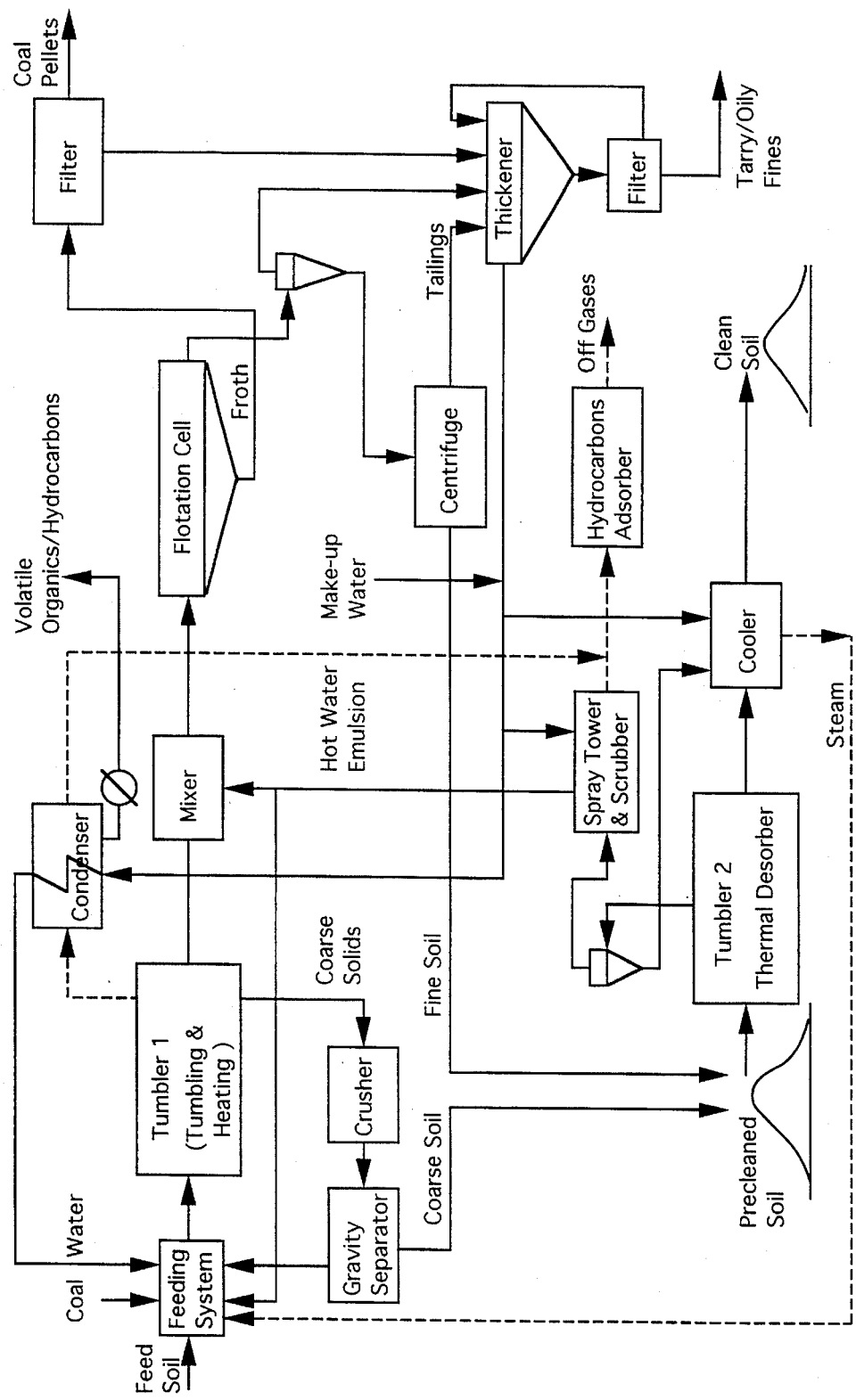
Figure 2A. Flowsheet of the Integrated Process for Treating Tar/Oil Contaminated Soil According to the Present Invention.

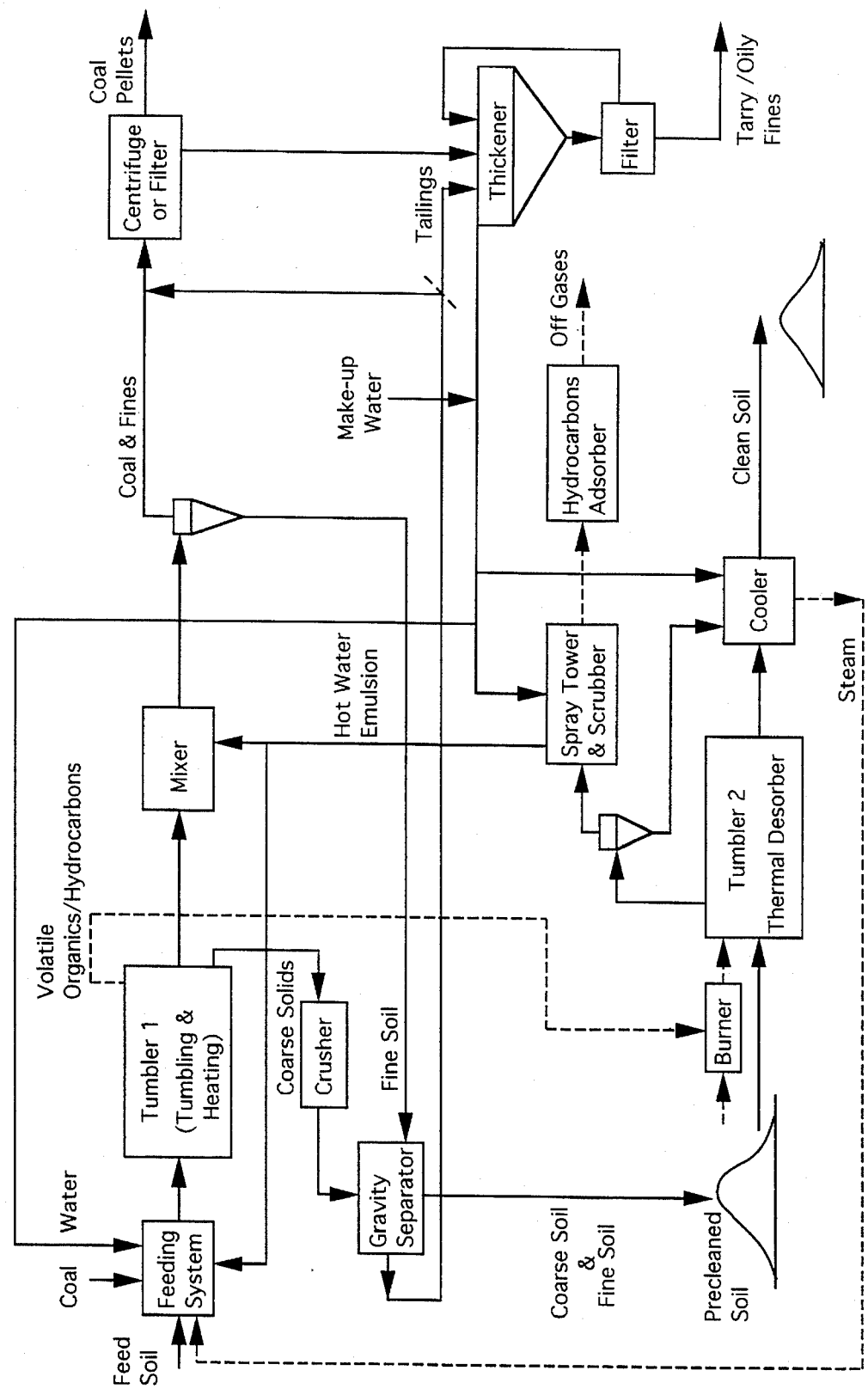
Figure 2B. Flowsheet of the Integrated Process for Treating Tar/Oil Contaminated Soil According to the Present Invention.

METHOD FOR CLEAN-UP OF SOILS OR REFUSE MATERIALS CONTAMINATED WITH HIGHLY VISCOUS COAL OR PETROLEUM DERIVED TARS/OILS

This is a continuation of application Ser. No. 08/170,877 filed Dec. 21, 1993 (now abandoned).

The present invention is directed to a method for efficient removal of tarry/oily, high viscosity organics from contaminated soil or refuse material. It is particularly useful for cleaning coal tar contaminated soils to a level of total residual concentration of organics (toluene soluble matter) below ~100 ppm and total residual concentration of selected PAH's (see Table 4 for individual PAH's) below 3 ppm.

BACKGROUND OF THE INVENTION

With the increasing awareness of pollution and, in particular, soil contamination, considerable effort is being devoted to soil clean-up. Whilst clean-up of soils contaminated with volatile organics/hydrocarbons has been successfully practiced for the last 10 years, using a variety of methods, much less progress has been done in cleaning the soils contaminated with tarry/oily highly viscous organics/hydrocarbons containing also slag, carbonaceous materials (like coal, char, coke) and other inorganic impurities. A notable exception is a soil washing technique where coal is employed as contaminant adsorbent; this technology is described in U.S. Pat. No. 5,019,245, issued May 28, 1991 and U.S. patent application Ser. No. 08/065,489 (now abandoned) filed May 24, 1993 and it is known and referred to as Clean soil Process.

While the technology described in the Patent and Patent Application referred to, above, can effectively separate a heterogeneous tar/oil contaminated soil into homogeneous product streams, the cleanliness of the two streams of processed soil, namely "coarse clean solids" (like rocks, pebbles, gravel, etc.) and the "fine clean soil" (mineral matter components; top size 3.3 mm, preferably 1.0 mm) is not always satisfactory. Typically the coarse clean solids will contain about 100–7,000 ppm of total toluene soluble material and the concentration of PAH's in these solids can vary from about 10–300 ppm. The fine clean soil will contain about 100–2,000 ppm of total toluene soluble material and the concentration of PAH's in fine soil can vary over a range of 1–100 ppm.

The residual concentration of contaminants in clean coarse and fine soils generated by the method described in the Patent and Patent Application referred to above is, in some cases, too high to return these soils to the ground. The soil precleaned by Clean Soil Process could be subjected to post-treatment by employing some suitable post-treatment method but this would, as a rule, significantly add to the total clean-up cost.

It is the objective of the present invention to provide a process for cleaning the coarse and fine soils to a very high degree of cleanliness, namely: the residual concentration of total toluene soluble material to 100 ppm or less and the residual concentration of total PAH's below 3 ppm.

It is yet another objective of the present invention to achieve this high degree of cleanliness at a cost significantly lower than the combined cost of primary clean-up (using the Clean Soil Process) and subsequent post-treatment (using the conventional thermal desorption technology).

These and other objectives of the present invention will be apparent from the following description and from the practice of the invention.

SUMMARY OF THE INVENTION

The present invention is based on integration of selected unit processes of the Clean Soil Process with selected elements of the modified thermal desorption technique.

The invention provides a method for separating the tarry and/or oily highly viscous (API Gravity below 14) organic matter from coarse and fine soils in a feedstock containing such soils and such organic matter, comprising the steps of combining the feedstock with hot water and contaminant adsorber in pulverized form whenever the ratio of solids to water is from 30:70 to about 60:40, and the ratio of contaminant adsorber to contaminant is from 10:100 to 87:13; tumbling the said mixture in the first tumbler and evaporating and quantitatively collecting the volatile organics/hydrocarbons, separating the coarse solids by screening the slurry, adding to the residual slurry about 0.05% of selected commercial frother (based on total solids weight), agitating the slurry and floating the generated froth containing very fine (below 0.075 mm) mineral matter and contaminant adsorber together with tarry and/or oily organics, separating the froth from the residual slurry containing the soil. Separating the soil from the residual slurry and combining the soil with the coarse solids; heating the combined soils in a second rotary tumbler with hot (oxygen free) combustion gases; discharging the combined soils, characterized by very high degree of cleanliness, from the second tumbler; cooling the exiting, contaminant containing gases with a water spray; condensing the contaminant and recycling the contaminant in water emulsion to the first tumbler for separation.

The mixture comprised of the contaminated feed soil with hot water and pulverized contaminant adsorber is tumbled for about 5–20 min.; occasionally some surfactants are used during the tumbling process. The tumbling and agitation are carried out under conditions of maximum heat and mass transfer at temperatures 80°–95° C. (as described in detail in Patent Application. 08/065,489) depending on contaminants viscosity, volatility and solids particle size. An efficient separation of the volatile components from the slurry is taking place at this stage; the slurry is screened at 0.5–3.3 mm and the coarse (+) fraction of solids is washed on a trommel and, if needed crushed and separated (by gravity method) into coarse precleaned solids and coarse organic solids. The coarse organic solids (if present) can be further crushed and recycled into the process as contaminant adsorbent. The residual slurry containing (–) fraction of solids is diluted to about 10–40% total solids concentration, treated with frother and formed into a froth by supplying air into the slurry, which at this stage will have temperature about 20°–60° C. The frothing will separate from the slurry the tar and oils adsorbed on very fine mineral matter components (mainly clays) as well as the contaminant adsorbent. The remaining slurry (tailings) contains mainly precleaned fine soil (usually below 1.0 mm); the slurry is subjected to cycloning to separate the precleaned soil from the residual quantities of tarry/oily fines; the tarry/oily fines are collected in a thickener, filter pressed and combined with the froth material. The precleaned soil is separated by centrifugation and combined with the precleaned coarse solids. Combined precleaned fine and coarse soils are drained, air-dried and contacted in the thermal desorber with hot combustion gases. The exit temperature for the soils can be maintained within the range of 250°–480° C. The residual semivolatile contaminants present in the soil are volatilized and carried away from the soil in a stream of hot gases. The gases containing vaporized contaminants are directed to a tower with a water spray where the gases are cooled and the contaminants are condensed and transferred to water phase. The water is heated to about 95° C. and the contaminant/water emulsion exiting from the tower is fed back into the front end of the process where the emulsified contaminants act as collectors in the process. The gases exiting from the spraying tower have temperature about 70° C. and are passed through activated carbon prior to being released to the atmosphere. Clean fine and coarse soils are cooled with small quantities of make-up water and the generated steam is utilized in the front end of the process.

BRIEF DESCRIPTION OF THE DRAWINGS

FIG. 1 is a diagram showing the preferred steps according to the present invention for treating highly viscous tar/oil contaminated soils.

FIG. 2A is a simplified flowsheet of the integrated process according to the present invention.

FIG. 2B is a simplified flowsheet of the integrated process according to the present invention, where the flotation cell has been substituted with an efficient cycloning system; for some (coarser) soils this dramatically improves process performance.

INTRODUCTION TO THE DEVELOPMENT OF THE INVENTION CONCEPT

The present invention is directed to a method for effective clean-up of soils or refuse materials contaminated with highly viscous tarry materials and heavy hydrocarbons. This method is an improved version of the Clean Soil Process, integrated with selected elements of thermal desorption of the precleaned soil and effective utilization of heat and by-products generated in thermal desorption step.

The primary objective for this invention was to develop a process that would combine the low cost of processing of very heterogeneous material, typical of the Clean Soil Process, with high degree of cleanliness of the soil which, as a rule, only very costly technology can ensure.

Though some soil washing techniques have the capacity to clean the petroleum contaminated soil to about 1,000 ppm at a reasonable cost (US $50–130), none of the soil washing technologies (except for U.S. Pat. No. 5,019,245) can be applied to soils contaminated by Manufactured Gas Plants (MGP). The MGP contaminated soils after processing using the U.S. Pat. No. 5,019,245 technology are still characterized by relatively high concentration of residual total contaminants and PAH's (100–7000 ppm and 1–300 ppm, respectively).

MGP soils could be treated by incineration but the cost of this treatment (~US $1,000–2,000 per ton) is prohibitive. Thermal desorption (processing cost US $50–250) could not be employed for clean-up of MGP soils due to presence of slag, cokes and chars and problems with low partial pressure of some of the PAH's under conditions of high concentration of contaminants and limitations in terms of temperature applied and residence time.

Application of a technology described in U.S. Pat. No. 5,019,245 followed by post-treatment of the precleaned soil using the conventional thermal desorption technology would increase the cleanliness of the processed soil but the processing cost would be a sum of both processing costs. Furthermore, residual contaminants left in the precleaned soil would have to be free of S, N, Cl-containing compounds; conventional thermal desorption of contaminants containing S, N and Cl would require addition of gas scrubbing devices at the outlet of the secondary combustion system which would dramatically increase the cost of the process and convert it into an incineration process. Resultantly only a few selected MGP soils (without S, N and Cl-compounds) could be treated by the technology described in U.S. Pat. No. 5,019,245 followed by post-treatment using conventional thermal desorption.

DESCRIPTION OF THE INVENTION

This invention is directed towards a method for effective, low cost clean-up of the soil in an integrated system which combines the improved Clean Soil Process (U.S. Pat. No. 5,019,245 and U.S. patent application Ser. No. 08/065,489) and modified thermal desorption technology.

Specifically, this invention is directed towards modification of the conventional thermal desorption technology, and, integration of this modified thermal desorption technology with the key elements of the Clean Soil Process The present invention utilizes as a feedstock, the soils contaminated with highly viscous organics, slag, coal, coke, char, etc. None of the existing conventional soil washing technologies is effective for clean-up of such soils. Application of technology described in U.S. Pat. No. 5,019,245 to such soils will generate, as a rule (see FIG. 2) the following product streams: 1. volatile organics/hydrocarbon stream, 2. contaminant adsorber stream (coal pellets), 3. tarry/oily fines stream, 4. precleaned fine soil stream, 5. precleaned coarse soil stream. Streams 5. and 4. are fed into the thermal desorber. The thermal desorber is a steel revolving tumbler which is heated with hot combustion gases from methane or propane/butane fired burner. The total combined (for the two streams identified) concentration of contaminants entering the thermal desorber shall not exceed 0.8 wt%, preferrable 0.5 wt%. Furthermore, the streams fed to the tumbler can't contain any coarse organic solids (like coal, semicoke etc.). The tumbler is equipped with lifters in order to intensify the contact of the soil with the hot gases and, therefore, to facilitate the evaporation of contaminants from the surface of solids to gaseous phase. The temperature of gaseous phase can be adjusted over a range of 300°–800° C. in order to heat up the solids to a required exit temperature that ranges from 250°–480° C. The concentration of steam in the flue gases is about 50%. Low concentration of contaminants and presence of steam enhances the volatility of the contaminants at temperatures lower than boiling points for the contaminants. Maintaining reasonably low temperature prevents thermal decomposition of contaminants. Contaminants free coarse solids are separated at the exit from the tumbler and delivered into a cooling vessel together with a portion of fine clean soil. The residual portion of fine clean soil is separated from contaminant laden gas phase in a cycloning system from which it is directed to a cooling vessel. The combined clean fine/coarse soil is sprayed in the cooling vessel with make-up water in order to bring the surface temperature of the clean soil to about 120° C. The generated steam is utilized in the soil washing tumbler.

The hot gases from the cycloning system enter the spray tower(s) where they are cooled in a counter-current system with process recycle water. The tower is either an empty cylindrical vessel or, alternatively can be filled with solids shaped in such a way (for instance Rashing rings) that they increase the contact between the water spray, travelling downwards and the gas, travelling upwards. Instead of one large tower, two or three smaller towers can be employed (parallel or in a series) thus making the system readily transportable from one site to another. The water collected at the bottom of the tower(s) is a hot (95° C.) suspension of colloidal size organic impurities and extremely fine solid particulates which were not separated from the gas in the cycloning system. The water recovered at the bottom of the tower(s) is pumped back to the front end of the integrated process. The gas exiting the tower(s) is cooled down to a temperature of about 70° C. It is dewatered in a scrubber and freed of residual organics by passing through activated carbon adsorber. The process according to the present invention is particularly advantageous because the emulsified organics from the thermal desorption appear to be a very good substitute for the collectors applied in the process to enhance the floatability of the contaminant adsorber used in the Clean Soil Process. Furthermore, extremely fine solids (below 0.075 mm diameter) which are, as a rule, very contaminated and difficult to handle in conventional thermal desorption, are, in the present invention quantitatively collected in the spray water and separated, together with contaminant adsorber stream, that is either utilized for combustion or is directed for incineration when it contains hazardous components.

According to present invention, the most difficult MGP contaminated soils, characterized by extreme heterogeneity, which cannot be cleaned satisfactorily either by conventional soil washing technologies or by conventional thermal desorption processes, can be very well remediated by application of the integrated process composed of selected elements of the Clean Soil Process technology and modified thermal desorption process. By applying the new integrated technology it is possible to clean up to 90–95% of the soil processed to below 100 ppm of residual organics. The concentration of residual total PAH's in the final product is below 3 ppm (when the soil was contaminated with coal tar derived hydrocarbons) and below 1 ppm when the soil was contaminated with petroleum derived hydrocarbons.

The integration of the modified thermal desorption technology with the key elements of the Clean Soil Process, as described in this invention, will:

eliminate the secondary combustion chamber in the thermal desorption process thus resulting in
  reduction in heating cost by about 40–50%
  reduction in capital cost by more than 50% (elimination of secondary combustion chamber, cooling chamber, baghouse system; exhaust system)
allow the operation of primary treatment chamber at any temperatures as long as cracking of the contaminants leading to generation of gaseous (at ambient temperature) components does not take place
allow the utilization of the waste heat from gases from thermal desorption for heating the water required for the Clean Soil Process; this will eliminate the need for any other heat source for the integrated process
allow the utilization of the contaminants precipitated in spray water as collectors; this will reduce the operating cost of the process by up to $12 per ton of the contaminated soil
allow the utilization of the waste heat contained in the hot product soils for generation of steam required for the front end of the process
generate from MGP contaminated soils clean soils characterized by less than 100 ppm of total residual concentration of organics and less than 3 ppm total PAH's.
generate from petroleum contaminated soils clean soils characterized by less than 100 ppm of total residual concentration of organics and less than 1 ppm total PAH's Having described the embodiments of the present invention, the following examples are provided by way of illustration, but not by limitation.

EXAMPLE 1

An MGP contaminated soil sample containing coal, char, slag and other carbonaceous material and characterized by concentration of toluene soluble organics of 4.54 wt% was subjected to thermal desorption at various residence times ranging from 10 to 40 min. (see Table 1).

TABLE 1

Thermal Desorption of MGP Soil at 400° C.

| Test | Residence Time [min] | Organics Content In the Feed [ppm] | Organics Content In the Product [ppm] |
| --- | --- | --- | --- |
| 1 | 10 | 45400 | 8970 |
| 2 | 20 | 45400 | 2430 |
| 3 | 30 | 45400 | 1150 |
| 4 | 40 | 45400 | 710 |

The results show that:

after 40 min. desorption time the residual organics content in the product (determined by toluene extraction) was 710 ppm
there was rather insignificant difference between the residual organics contents for products from samples desorbed for 30 and 40 min.

The conclusions from these experiments are:

extremely long residence times would be required for MGP samples with large tar concentrations (over 2% by weight) and containing carbonaceous materials in order to clean the product to residual tar content below 100 ppm
based on results of tests 3 and 4 it appears that MGP samples containing carbonaceous material cannot be cleaned effectively because this material may generate, during thermal desorption, additional quantities of tar.

EXAMPLE 2

An MGP contaminated soil sample containing coal, char, slag and other carbonaceous material and total contamination of toluene soluble organics 4.54 wt% was subjected to Clean Soil Process (test 1) and, independently to thermal desorption (test 2). Subsequently the precleaned combined fine and coarse soil processed as described in U.S. Pat. No. 5,019,245, was subjected to thermal desorption (test 3). The results are presented in Table 2.

TABLE 2

Clean-up of MGP Soil by Employing Clean Soil Process (Test 1); Thermal Desorption (Test 2); Integration of Both Processes (Test 3)

| | Clean Soil Process Organics content (ppm) | | Thermal Desorption (400° C.; 20 min.) Organics content (ppm) | |
| --- | --- | --- | --- | --- |
| Test | Feed | Product | Feed | Product |
| 1 | 45400 | 3080 | — | — |
| 2 | — | — | 45400 | 2430 |

TABLE 2-continued

Clean-up of MGP Soil by Employing Clean Soil
Process (Test 1); Thermal Desorption (Test 2);
Integration of Both Processes (Test 3)

| | Clean Soil Process Organics content (ppm) | | Thermal Desorption (400° C.; 20 min.) Organics content (ppm) | |
|---|---|---|---|---|
| Test | Feed | Product | Feed | Product |
| 3 | 45400 | 3080 | 3080 | 80 |

It appears that neither the Clean Soil Process (test 1) nor the thermal desorption (test 2) could reduce the total contamination of toluene soluble organics to below 100 ppm. However, when the soil precleaned using the Clean Soil Process (freed of carbonaceous organics: coal char, slag and other carbonaceous material) was subsequently thermally desorbed (under the same conditions as in test 2, namely 20 min. residence time at 400° C.) the residual total concentration of organics was reduced to 80 ppm.

Results presented in Table 1 (tests 2 and 4) show that thermal desorption of MGP sample containing 2430 ppm organics but, in addition, contaminated with carbonaceous material, was cleaned after 20 min. to 710 ppm of residual total concentration of organics while a sample containing 3080 ppm organics but freed of carbonaceous material could be cleaned under the same thermal desorption conditions to 80 ppm residual total concentration of organics (see Table 2 - test 3).

EXAMPLE 3

In another series of experiments the same sample of MGP contaminated soil (as used in Examples 1 and 2) was subjected to Clean Soil Process treatment under various conditions that totally eliminated the presence of carbonaceous materials (coal, coke, char, slag) in the precleaned sample but generated subsamples characterized by residual concentration of toluene soluble organics from 26,700 ppm down to 1,700 ppm. So obtained precleaned samples were subsequently subjected to thermal desorption in nitrogen atmosphere, at 300° C. and residence time of 15 min., The results are presented in Table 3.

TABLE 3

Results of Thermal Desorption Experiments
Carried out at 300° C. with MGP Sample
(initial Organics Content 45,400 ppm)
Pretreated Under Various Conditions Using
the Clean Soil Process

| | Pretreated Feed (ppm) | | Product (ppm) | |
|---|---|---|---|---|
| Test | Total Organics | Total PAH's | Total Organics | Total PAH's |
| 1 | 26,700 | 3,205 | 630 | 5.6 |
| 2 | 15,600 | 2,043 | 280 | 1.8 |
| 3 | 8,200 | 679 | 190 | 4.7 |
| 4 | 5,000 | 742 | 110 | 0.9 |
| 5 | 3,800 | 178 | 90 | 2.1 |
| 6 | 3,300 | 148 | 80 | 0.4 |
| 7 | 2,200 | 156 | 120 | 0.2 |
| 8 | 1,700 | 38 | 50 | 0 |

The results show that:

though the samples were freed prior to thermal desorption from carbonaceous materials (like coal, char, slag) under the desorption conditions tested (300° C., 15 min.), the feed had to contain not more than 5,000 ppm organics to generate products with about 100 ppm or less organics and less than 3 ppm PAH's.

the kinetics of removal of organics from samples pretreated using Clean Soil Process (measured as a ratio of total organics in the feed/total organics in the product) was significantly higher compared to the samples which were not pretreated (see Table 1–10 and 20 min. residence time) though the desorption temperature for pretreated samples was only 300° C. instead of 400° C.

microscopic examination revealed that the pretreated samples had the residual tar (organics) dispersed uniformly over the whole surface; untreated samples had very uneven distribution of tar on their surface including tar globules and droplets present; this has a dramatic impact on lowering the kinetics of removal of organics from untreated samples.

Table 4 presents results of determination of the individual PAH's in feeds and products of tests #2 and #4 presented in Table 3.

TABLE 4

Concentration of Selected PAH's After Thermal Desorption

| Selected PAH | Test #2 | | Test #4 | |
|---|---|---|---|---|
| (ppm) | Feed | Product | Feed | Product |
| Acenaphthene | 28.1 | ND | 22.3 | ND |
| Acenaphthylene | 10.4 | ND | 4.5 | ND |
| Anthracene | 43.0 | ND | 58.2 | ND |
| Benzo(a)anthracene | 32.8 | 0.1 | 31.5 | trace |
| Benzo(ghi)peryiene | ND | 0.5 | 8.8 | trace |
| Benzo(a)pyrene | 24.6 | 0.3 | 25.7 | ND |
| Chrysene | 34.1 | 0.2 | 45.7 | trace |
| Dibenzo(ah)anthracene | ND | ND | trace | trace |
| Fluoranthene | 103.5 | 0.2 | 133.8 | ND |
| Fluorene | 37.3 | ND | 49.8 | ND |
| Naphthalene | 1504 | 0.2 | 121.5 | 0.9 |
| Phenanthrene | 126.6 | 0.2 | 154.9 | trace |
| Pyrene | 5 | 0.1 | 85.2 | trace |
| TOTAL PAH | 2043 | 1.8 | 742 | 0.9 |

In conclusion, for coal tar contaminated soil samples freed, using the Clean Soil Process, of carbonaceous materials (coal, char, slag, etc.) and precleaned to a level of about 5,000 ppm or less of total organics content, it is possible by integration of this process with modified thermal desorption to clean these samples to about 100 ppm or less of total organics and below 3.0 ppm of total PAH's.

What is claimed is:

1. A method for the clean-up of coal-tar and/or petroleum contaminated soils which is based on the integration of soil washing techniques with modified thermal desorption and comprises the steps of:

(a) precleaning the contaminated soil or refuse material by:

slurrying in water the contaminated soil with pulverized contaminant adsorbent to form a first mixture of between 30% to 60% solids with a ratio of contaminant adsorbent to contaminant being from 10:100 to 87:13 and feeding said first mixture in a tumbling and heating step;

agitating said first mixture at a temperature of between 80°–95° C. in said tumbling and heating step for a time of about 5–20 minutes then screening coarse fraction containing coarse soil and coarse organic solids at a size of 0.5–3.3 mm from said first mixture to yield a resultant mixture without said coarse fraction;

adding to said resultant mixture a frother and diluting said resultant mixture to between 10–40% solids concentration thereby forming a second mixture;

subjecting said second mixture to flotation in the presence of air which causes a floating froth to form, said froth composed of fines containing the contaminants and separating off the floating froth from the remaining slurry; the remaining slurry containing precleaned fine soil;

separating the precleaned fine soil from the remaining slurry thereby resulting in a precleaned fine soil fraction;

separating the coarse soil from the coarse organic solids thus resulting in a precleaned coarse soil fraction;

(b) either combining the precleaned fine soil fraction and the precleaned coarse soil fraction and feeding the combined fraction to a thermal desorber step, or feeding the precleaned fine soil fraction to a thermal desorber step or feeding the precleaned coarse soil fraction to a thermal desorber step;

(c) heating the precleaned soil fraction from step b) in said thermal desorber at a temperature range of 250°–480° C., residence time of up to 20 minutes while employing the heat of combustion gases for the heating; maintaining the partial pressure of steam in the combustion gases at a level of about 50% and forming therein a stream of hot gases with residual contaminants and clean very fine soil therein;

(d) discharging clean fine and/or clean coarse soil from the thermal desorber into a cooling vessel where steam is generated;

(e) separating clean very fine soil from hot gases exiting the thermal desorber by cycloning the hot gases stream exiting the thermal desorber; directing the separated clean very fine soil to cooling vessel;

(f) directing the hot gases still containing residual contaminants from the cyclone to a spray tower where the hot gases are cooled with recycle water and thus heating the recycle water to about 95° C. while including in said recycle water residual contaminants;

(g) directing the hot recycle water containing the residual contaminants to step (a) of the process where the contaminated soil is slurried.

\* \* \* \* \*